(12) United States Patent
Engelhardt et al.

(10) Patent No.: US 7,218,015 B2
(45) Date of Patent: May 15, 2007

(54) METHOD OF PROVIDING A CONSTANT AC VOLTAGE TO A REMOTE VARIABLE LOAD

(75) Inventors: Reinhard Engelhardt, Duderatadt (DE); Stephan Leschke, Bad Lauterberg am Harz (DE)

(73) Assignee: RWE Piller GmbH, Osteorde am Harz (DE)

( * ) Notice: Subject to any disclaimer, the term of this patent is extended or adjusted under 35 U.S.C. 154(b) by 396 days.

(21) Appl. No.: 10/618,138

(22) Filed: Jul. 11, 2003

(65) Prior Publication Data

US 2004/0008014 A1    Jan. 15, 2004

(30) Foreign Application Priority Data

Jul. 15, 2002    (DE) ................. 102 32 074

(51) Int. Cl.
*H02J 3/12* (2006.01)
*H02J 3/14* (2006.01)
*H02H 3/00* (2006.01)

(52) U.S. Cl. ................. 307/103; 361/18; 361/85
(58) Field of Classification Search ......... 307/103
See application file for complete search history.

(56) References Cited

U.S. PATENT DOCUMENTS 2,147,490 A * 2/1939 Kuyper .............. 307/103
2,218,762 A * 10/1940 McLachlan ........... 307/103
6,628,014 B2 * 9/2003 Borup .................. 307/103

OTHER PUBLICATIONS

Gester, Dipl.-oec Ing. Johannes; "Starkstromleitungen und Netze", Veb Verlag Technik Berlin, pp. 151-158, and 192-193, date not available.

* cited by examiner

*Primary Examiner*—Robert L. Deberadinis
*Assistant Examiner*—Hal I. Kaplan
(74) *Attorney, Agent, or Firm*—Thomas, Kayden, Horstemeyer & Risley, LLP

(57) ABSTRACT

To the end of providing a constant AC voltage to a variable load (1) which is arranged remote of a voltage source (3), a voltage drop over an electrical supply line (2) which connects the load to the voltage source (3) is compensated for by a compensation AC voltage which, if added to the constant AC voltage, results into the output AC voltage $U_{full}$ of the voltage source (3) and the value of which is varied depending on the absolute value of the alternating current (I) conducted to the load (1) and on the phase angle phi between the output AC voltage $U_{full}$ of the voltage source (3) and the alternating current (I).

22 Claims, 1 Drawing Sheet

METHOD OF PROVIDING A CONSTANT AC VOLTAGE TO A REMOTE VARIABLE LOAD

CROSS REFERENCE TO RELATED APPLICATIONS

This application claims priority to co-pending German Patent Application No. 102 32 074.8 entitled "Verfahren zur Versorgung einer entfernt angeordneten variablen Last mit einer konstanten Wechselspannung", filed Jul. 15, 2003.

FIELD OF THE INVENTION

The invention relates to a method of providing a constant AC voltage to a variable load which is arranged remote of a voltage source, a voltage drop over an electrical supply line which connects the load to the voltage source being compensated for by a compensation AC voltage which, if added to the constant AC voltage, results in the output AC voltage of the voltage source, the value of which is varied depending on the absolute value of the alternating current conducted to the load.

BACKGROUND OF THE INVENTION

If an AC voltage is provided to a load which is arranged remote of a voltage source, the output AC voltage of the voltage source does not reach the load in full. Instead, a considerable voltage drop over the electrical supply line, which connects the load to the voltage source is observed. The relevant contributions to the voltage drop over the electrical supply line are provided by the ohmic resistance and the inductive reactance of the supply line. In addition, there is also a capacitive reactance which, however, may be neglected in most applications. The ohmic resistance and the inductive reactance of the supply line are not constant so that they can not be compensated for by a constant compensation AC voltage as a necessary addition to the desired constant AC voltage at the voltage source. Instead, they vary with the total value of the alternating current conducted to the load as the total value of the voltage drop caused by the ohmic resistance is |I|* R, and the total value of the voltage drop caused by the inductive reactance is |I|*ωL.

Thus, it is known in a method of the type described at the beginning to measure the total value of the alternating current conducted to the load and to multiply this total value by an adjustable constant for selecting the compensation AC voltage. The adjustable constant is selected depending on the actual supply line. This selection is, for example, effected in that the constant is increased starting at zero until the desired constant AC voltage is provided to the load. This known method does, however, not take into consideration that the voltage drop over the supply line caused by its ohmic resistance and the voltage drop over the supply line caused by its inductive reactance are to be summed up in a vector addition to determine the total voltage drop over the supply line, and that this total voltage drop over the supply line is also a vector so that an ideal compensation voltage is achieved by means of a closed vector triangle which is formed by the drop in voltage over the supply line, the output voltage of the voltage source and the AC voltage at the load. In other words, a determination of the compensation AC voltage only depending on the total value of the alternating current conducted to the load is insufficient, if a phase angle phi between the alternating current conducted to the load and the output AC voltage of the voltage source varies, because this variation changes the direction of the vectors mentioned above and the ratio of the real component and the imaginary component of the complex AC voltage quantities.

In a further method of the type described at the beginning, in addition to the variation of the value of the compensation AC voltage depending on the total value of the alternating current conducted to the load, a compensation capacity is connected in series with the supply line connecting the load to the voltage source to compensate for the inductive reactance by means of a capacitive reactance to such an extent that the voltage drop over the electrical supply line is now only determined by its ohmic resistance which is only depending on the total value of the alternating current conducted to the load. The phase angle between the output AC voltage of the voltage source and the alternating current conducted to the load, however, depends on the inductivity of the whole system, which may vary to a considerable extend. Thus, it is impossible, to adjust the phase angle to zero by means of a constant capacitance. On the other hand, considerable dangers are incurred by the additional high capacitance in the supply line to the load.

As a further method of providing a constant AC voltage to a variable load which is arranged remote of a voltage source, a voltage drop over an electrical supply line which connects the load to the voltage source is compensated for by means of a compensation AC voltage which, if added to the constant AC voltage, results in the output AC voltage of the voltage source, the AC voltage reaching the load being measured and being used as an actual value for controlling the voltage source. This method results in a constant AC voltage at the load independently of any changes in the whole system. However, problems can occur, if measuring supply lines which also run between the voltage source and the load, are affected by disturbances. The function of the known method is lost, if any of the measuring supply lines breaks.

Thus it would be desirable to provide a method of providing a constant AC voltage to a variable load by which the compensation AC voltage is selected in such a way that it results in a constant AC voltage at the load over a greater range of variations of the load. At the same time, the method should be easily applied and implemented.

SUMMARY OF THE INVENTION

The present invention relates to a method of providing a desired constant AC voltage to a variable load which is arranged remote of a voltage source, comprising the steps of compensating for a voltage drop over an electrical supply line which connects the load to the voltage source by a compensation AC voltage; the compensation AC voltage being added to the desired constant AC voltage to determine an output AC voltage of the voltage source; varying the compensation AC voltage depending both on an absolute value of an alternating current conducted to the load and on a phase angle phi between the output AC voltage of the voltage source and the alternating current.

Other features and advantages of the present invention will become apparent to one with skill in the art upon examination of the following drawings and the detailed description. It is intended that all such additional features and advantages be included herein within the scope of the present invention, as defined by the claims.

DESCRIPTION OF THE INVENTION

The core idea of the new method is to consider the vectorial properties of the voltage drop over the supply line by means of the phase angle phi. The phase angle phi can be quite easily determined at the voltage source. It is, for example obtainable in that a vector product of the output AC voltage and the alternating current and a scalar product of the total value of the output AC voltage and the total value of the alternating current are calculated at the voltage source. This may be effected by means of a point by point multiplication of the total values of the output AC voltage and the alternating current which are present at the same point of time, on the one hand, and the effective values of the output AC voltage and the alternating current, on the other hand. These two values represent the effective electric power, on the one hand, and the apparent electric power, on the other hand.

With the new method, it became apparent that it is not critical to consider every effect of the phase angle phi. Instead, it has been proved as sufficient that the compensation AC voltage comprises two summands which are supply linearly dependent on the total value of the alternating current, and one of which is additionally supply linearly dependent on cos(phi) and the other of which is additionally supply linearly dependent on sin(phi). Besides the factors |I| and cos(phi) or sin(phi), respectively, both summands comprise a constant, which is to be adapted to the actual supply line from the voltage source to the load. The constant $C_R$ associated with the factors |I| and cos(phi) is determined by the ohmic resistance of the supply line. In the new method, this constant can quite easily be obtained in that, with an ohmic load at the place of the variable load, a total value of the full output AC voltage $|U_{full}|$ provided by the voltage source, a total value of the AC voltage $|U_{load}|$ dropping over the ohmic load, and a total value of the alternating current |I| which is conducted at that same time are measured. By means of the ohmic load at the place of the variable load, the phase angle phi between the output AC voltage of the voltage source and the alternating current conducted to the load is minimized, i.e. phi is close to zero. Thus, the contribution of the inductive reactance of the supply line to the voltage drop over the supply line is also close to zero. In other words, the voltage drop over the supply line is nearly only determined by the ohmic resistance. This allows for determining the constant $C_R$ from the above measured values as $(|U_{full}|-|U_{load}|)/|I|$.

The second constant $C_L$ associated with the factors |I| and sin(phi) represents the inductive reactance ωL of the supply line. In the new method, this value can be determine in that, with a mixed ohmic and inductive load at the place of the variable load, a total value of the output AC voltage $|U_{full}|$ provided by the voltage source, a total value of the AC voltage $|U_{load}|$ dropping over the ohmic load, a total value of the current |I| conducted at the same time, and the phase angle phi are measured. The mixed ohmic and inductive load at the place of the variable load can be the variable load itself. It is important, that the mixed ohmic and inductive load results in a considerable phase angle phi like that one which may occur in the operation of the variable load. The constant $C_L$ can be determined from the measured values as $[|U_{full}|-|U_{load}|-C_R*|I|*\cos(phi)]/[|I|*\sin(phi)]$. Whereas it is assumed in determining the constant $C_R$ that the phase angle phi is negligible because of the pure ohmic load at the place of the variable load, it is assumed in determining the constant $C_L$ that a phase angle between the output AC voltage of the voltage source and the AC voltage at the load is negligible or that at least any effects of a change in this phase angle are negligible at the end. The selection of the compensation AC voltage based on the above described summands including $C_R$ and $C_L$ is based on this assumption. However, it becomes apparent that this assumption does not result in relevant errors, i.e. despite the included approximation the AC voltage obtained at the load is very constant even with strong changes of the load.

This is particularly the case, if at least the constant $C_L$ is determined at a value of $|U_{load}|$ which is about equal to the desired constant AC voltage. I.e. at least the constant $C_L$, preferably both constants $C_R$ and $C_L$, are determined under conditions for the supply line, which are close to the working conditions for the supply line, so that they also cover the properties of the voltage source under conditions close to the working conditions for the supply line.

As in the new method, measurements of the total value of the AC voltage $|U_{load}|$ drop over the load are required, i.e. measurements at a place remote of the voltage source, it has been proved as advantageous that the constants $C_R$ and $C_L$ are at first approximated at a value of $|U_{full}|$ which is about equal to the desired constant AC voltage, and then a value of $|U_{load}|$ which is equal to the desired constant AC voltage is approached with the approximated values. Afterwards, the final values of $C_R$ and $C_L$ are determined.

If the voltage source is a rotating frequency converter, an exciting power of a generator is varied to achieve a variation of the compensation AC voltage. The variation of the exciting power of the generator varies the compensation AC voltage for all phases of the voltage source in the same way. Thus, a compromise has to be made. The supply line to the load has different properties for the single phases. It is an option to determine the ideal compensation AC voltages for all phases and to calculate a mean value.

In case of a voltage source in form of a static frequency converter or of an electronically controlled transformer it is, however, possible and also suitable to vary the compensation AC voltage separately for each phase of the AC voltage. Thus, different conditions of the supply line for each phase can be taken into consideration to their full extent.

SHORT DESCRIPTION OF THE DRAWINGS

In the following, the invention is further explained and described by means of an embodiment example. Here, FIG. 1 is a single line diagram of a supply line between a voltage source and a load, and FIG. 2 is a vector addition of the voltage drops in the arrangement according to Fig. 1.

DESCRIPTION OF THE DRAWINGS

Up to now it has been described in general that the invention is related to providing an AC voltage to a remote variable load, without giving details of the AC voltage. The mentioned problems of the prior art, however, particularly occur with AC voltages of higher frequency, i.e. at frequencies clearly above 50 or 60 Hz. With supply network AC voltages of 50 or 60 Hz, the effects of a varying phase angle between the output AC voltage of the voltage source and the current conducted to the load are often only small. A technical field, however, in which highly relevant effects of the phase angle phi are observed, is the power supply of airplanes on the ground. Airplanes on the ground are connected to voltage sources which provide an AC voltage of 400 Hz adapted to the electric and electronic equipment of the airplanes by means of quite long supply lines. In this frequency range the mentioned effects are highly relevant. At the same time it is important for the sensitive electronic equipment on board of an airplane that the voltage supply is effected with a constant voltage of typically 115 Volt, only small deviations of ±3 Volt at maximum being acceptable. Naturally, a restriction to even smaller deviations should be achieved. It is easily achieved by means of the new method.

Figure 1:
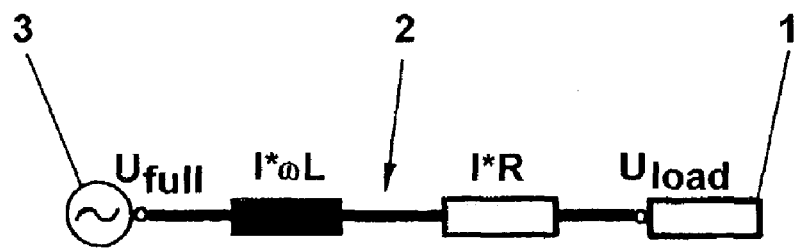
FIG. 1 illustrates a load 1 which is connected to a voltage source 3 remote of the load by means of a supply line 2. A voltage $U_{load}$ is provided to the load 1 which essentially deviates from the output voltage $U_{full}$ of the voltage source 3 because of the conducting properties of the supply line 2. The main contributions are caused by the ohmic resistance I*R and the inductive reactance I*ωL of the supply line 2.
Figure 2:
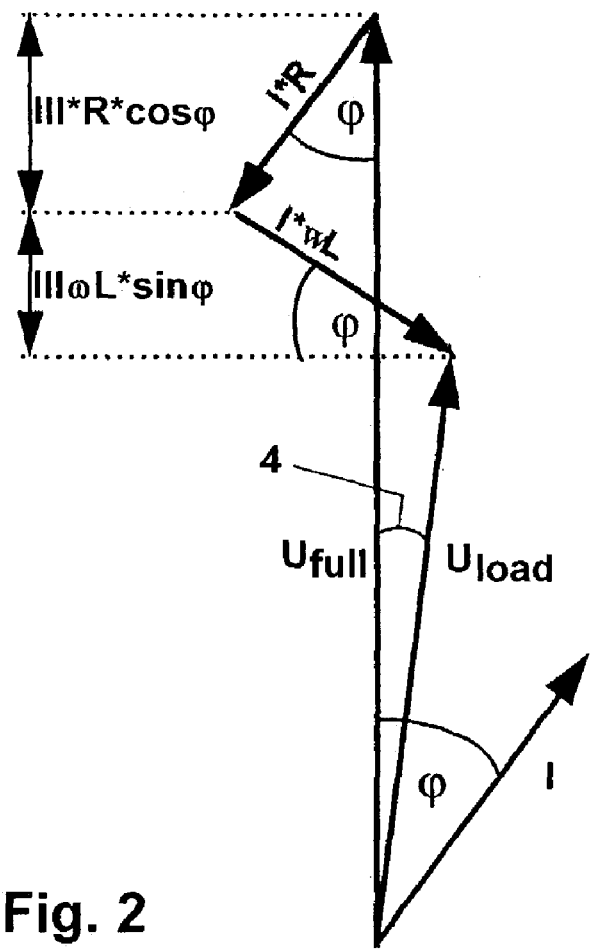
In FIG. 2 all of these quantities are depicted as vectors. The vector difference between $U_{full}$ and $U_{load}$ comprises two components I*R and I*ωL. These two components are perpendicular to each other. Further, the orientation of the component I*R with regard to $U_{full}$ is determined by the phase angle phi between $U_{full}$ and the current I conducted to the load. Thus, even with constant total values of |I|*R and |I|*ωL, the total value of |$U_{load}$| may change with the phase angle phi to a considerable extent. Vice versa, this means that it is not sufficient for keeping a constant value of |$U_{load}$| to vary |$U_{full}$| by means of an addition which is only dependent on |I|. Instead, the phase angle phi has also to be considered. Naturally, this is particularly the case with a stronger variation of the values of phi. This stronger variation nearly occurs, if, for example, a constant AC voltage is to be provided to different airplanes on the ground as loads 1. Even with one and the same airplane, the phase angle phi may be strongly varied because of differing activations of electric and electronic equipment in the airplane, for example, upon switching on an electric air-conditioner.

To the end of adding a compensation AC voltage to a constant AC voltage, which is desired for being provided to the load 1, at the voltage source 3 in such a way that the actual voltage drop over the supply line 2 is exactly compensated for so that exactly the desired AC voltage reaches the load 1, the phase angle phi of the alternating current conducted to the load has also to be considered besides its absolute value |I|. Further, the ohmic resistance R and the inductive reactance ωL of the supply line 2 have to be known. |I| and phi may be determined at the voltage source 3. However, it is not trivial to obtain the values R and ωL of the supply, line in a simple way. Even if these values R and ωL are known, an exact vectorial determination of the compensation voltage according to the vector diagram of FIG. 2 would be difficult.

Surprisingly, however, it can be shown that a compensation AC voltage $U_{comp}$ can be determined by means of the following rules, and that in this way the AC voltage $U_{load}$ at the load 1 can be kept within a very small window around the predetermined desired value of the AC voltage. The compensation AC voltage $U_{comp}$ has two summands |I|*$C_R$*cos(phi) and |I|*$C_L$*sin(phi). The first summand corresponds to the length of the vector I*R, i.e. the ohmic contribution to the voltage drop over the supply line 2 in the direction of the output AC voltage $U_{full}$ of the voltage source 3. The second summand corresponds to the length of the vector |I|*ωL, i.e. to the inductive contribution to the voltage drop over the supply line 2 in this same direction. If $C_R$ is R and $C_L$ is ωL, the compensation AC voltage $U_{comp}$ determined from these values comprises an inaccuracy, because there is a phase angle 4 between $U_{full}$ and $U_{load}$. This phase angle 4, however, is small so that this error has no significant effect. Further, the same error also occurs in determining the constants $C_R$ and $C_L$, which determination takes place in the new method prior to the determination of the compensation AC voltage $U_{comp}$ by means of the two summands indicated above.

For determining $C_R$, a pure ohmic load, i.e. an ohmic resistance is connected to the supply line 2 at the place of the load 1 which typically also has an ohmic resistance part and an inductive reactance part and possibly also a capacitive reactance part. The size of the ohmic resistance is not critical. However, it should show about the same ratio with regard to the ohmic resistance R of the supply line 2 as the desired AC voltage to be provided to the load 1 to the voltage drop over the supply line 2. Because of the pure ohmic load at the place of the load 1, the phase angle phi is close to zero, as the inductive reactance ωL of the supply line 2 alone is not sufficient to incur a significant phase angle phi between the full voltage $U_{full}$ and the current I. Thus, the voltage drop over the supply line 2 is nearly only determined by the ohmic resistance part I*R. Thus, by means of measuring $U_{full}$ and $U_{load}$ as well as I, a value for the constant $C_R$ can be determined which is close to the ohmic resistance R of the supply line 2. Concretely, the constant $C_R$ is determined as (|$U_{full}$|−|$U_{load}$|)/|I|.

As a next step, the constant $C_L$ is determined using the already determined constant $C_R$ and further measurement values which are obtained with a mixed ohmic and inductive load at the place of the load 1. The mixed ohmic and inductive load can be the real load 1. Anyway, it is selected so that its inductive reactance part creates a significant phase angle phi so that cos(phi) is, for example, in the order of 0.8. With this load, the total values of $U_{full}$, $U_{load}$, I and phi are now measured. Then $C_L$ is determined as [|$U_{full}$|−|$U_{load}$|−$C_R$*|I|* cos(phi)]/[|I|* sin(phi)]. This corresponds to the determination of ωL from the vector diagram according to FIG. 2 without considering the phase angle 4 between $U_{full}$ and $U_{load}$, and under the assumption that $C_R$ is R. With the values of $C_R$ and $C_L$ determined in this way, however, a compensation AC voltage is obtained by calculating the above summands which results in an AC voltage $U_{load}$ being provided to the load 1, which is constant within narrow limits over a broad range of variations of the load 1. I.e., the assumptions and approximations on which the steps of the new method are based are innocuous. In part, they are compensated for in that both in determining the constants, particularly $C_L$ as a measure of the inductive reactance ωL, and in the later determination of the compensation voltage the phase angle 4 between $U_{full}$ and $U_{load}$ is not considered. So far as the phase angle 4 is approximately of the same size here, all resulting inaccuracies are nearly compensated for to their full extent. However, even the total of these inaccuracies is only small, because the phase angle 4 is much smaller than phi. With a supply line 2, the resistance properties of which do not change, the value of the voltage $U_{load}$ can be kept constant by means of the compensation voltage consisting of the above indicated summands with a much smaller error than acceptable in usual applications. The compensation AC voltage is calculated in an optimum way, if the constants $C_R$ and $C_L$ have been determined under such conditions under which $U_{load}$ has already been about equal to the desired AC voltage at the load. This can, for example, be achieved in that at first approximated values are obtained for $C_R$ and $C_L$ with the total value of $U_{full}$ being set to the desired AC voltage. Then, a value is determined for $U_{full}$ with these approximated values to re-measure at least CL under such conditions under which $U_{load}$ is about equal to the desired AC voltage. The new method can be implemented at comparatively little cost as, after the determination of the constants $C_R$ and $C_L$, it only requires measurements Of $U_{full}$ and I, because these values also allow for a determination of the phase angle phi by means of a point by point multiplication, on the one hand, and a multiplication of the effective values, on the other hand. The calculation of the compensation AC voltage from the two summands indicated above is obviously even more simple.

LIST OF REFERENCE NUMERALS 01. load
02. supply line
03. voltage source
04. phase angle

The invention claimed is:

1. A method of providing a desired constant AC voltage to a variable load which is arranged remote of a voltage source, comprising the steps of:
compensating for a voltage drop over an electrical supply line which connects the load to the voltage source by a compensation AC voltage, the compensation AC voltage being added to the desired constant AC voltage to determine an output AC voltage of the voltage source;
connecting an ohmic load instead of the variable load via the supply line to the AC voltage source and measuring a total value of the output AC voltage $|U_{full}|$ provided by the voltage source, a total value of an AC voltage $|U_{load}|$ drop over the ohmic load, and a total value of the alternating current |I| which is conducted at that same time;
determining a first constant $C_R$ from the measured values for the linear variation of the compensation AC voltage with the total value of the alternating current and cos(phi) from the measured values;
once the constant $C_R$ has been determined, connecting the variable load instead of the ohmic load via the supply line to the AC voltage source; and
varying the compensation AC voltage depending both on an absolute value of an alternating current conducted to the load and on a phase angle phi between the output AC voltage of the voltage source and the alternating current, wherein the step of varying the compensation AC voltage depending both on the absolute value of the alternating current conducted to the load and on the phase angle phi comprises the step of calculating the compensation AC voltage from two summands which are linearly dependent on the total value of the alternating current, and one of which additionally comprises the factor $C_{R*}$ cos(phi) and the other of which is additionally linearly dependent on sin(phi).

2. The method of claim 1, wherein the constant $C_R$ is determined as $(|U_{full}|-|U_{load}|)/|I|$.

3. The method of claim 1, further comprising the steps of connecting a mixed ohmic and inductive load instead of the variable load via the supply line to the AC voltage source, measuring a total value of the output AC voltage $|U_{full}|$ provided by the voltage source, a total value of the AC voltage $|U_{load}|$ dropping over the ohmic component of the mixed ohmic and inductive load, a total value of the current |I| conducted at the same time, and the phase angle phi, and determining a second constant $C_L$ for the linear variation of the compensation AC voltage with the total value of the alternating current and sin(phi) from the measured values.

4. The method of claim 1, further comprising the steps of:
supplying the output AC voltage to the variable load;
measuring a total value of the output AC voltage $|U_{full}|$ provided by the voltage source, a total value of the AC voltage $|U_{load}|$ dropping over an ohmic component of the variable load, a total value of the current |I| conducted at the same time, and the phase angel phi; and
determining a second constant $C_L$ for the linear variation of the compensation AC voltage with the total value of the alternating current and sin(phi) from the measured values.

5. The method of claim 3, wherein the constant $C_L$ is determined as $[|U_{full}|-|U_{load}|-C_R* |I|* \cos(phi)]/[|I|* \sin(phi)]$.

6. The method of claim 3, wherein the constant $C_L$ is determined at a value of $|U_{load}|$ which is equal to the desired constant AC voltage.

7. The method of claim 6, wherein the constant $C_R$ is determined at a value of $|U_{load}|$ which is equal to the desired constant AC voltage.

8. The method of claim 6, wherein the constants $C_R$ and $C_L$ are at first approximated at a value of $|U_{load}|$ which is equal to the desired constant AC voltage, and then a value of $|U_{load}|$ which is equal to the desired constant AC voltage is approached with the approximated values of $C_R$ and $C_L$.

9. A method of providing a desired constant AC voltage to a variable load which is arranged remote of a voltage source, comprising the steps of:
compensating for a voltage drop over an electrical supply line which connects the load to the voltage source by a compensation AC voltage, the compensation AC voltage being added to the desired constant AC voltage to determine an output AC voltage of the voltage source; and
varying the compensation AC voltage depending both on an absolute value of an alternating current conducted to the load and on a phase angle phi between the output AC voltage of the voltage source and the alternating current,
wherein the voltage source is a rotating frequency converter, and further comprising the step of varying an exciting power of a generator to achieve a variation of the compensation AC voltage.

10. The method of claim 1, wherein the voltage source is selected from a static frequency converter and an electronically controlled transformer, and further comprising the step of separately varying the compensation AC voltage for each phase of the output AC voltage of the voltage source.

11. A method of providing a desired constant AC voltage having a frequency at least 200 Hz to an airplane which is positioned on the ground remote of a voltage source and which is connected to the voltage source via a supply line, comprising the steps of:
connecting an ohmic load via the supply line to the AC voltage source, measuring a total value of the output AC voltage $|U_{full}|$ provided by the voltage source, a total value of an AC voltage $|U_{load}|$ dropping over the ohmic load, and a total value of the alternating current |I| which is conducted at that same time;
determining a first constant $C_R$ as $(|U_{full}|-|U_{load}|)/|I|$;
connecting a mixed ohmic and inductive load via the supply line to the AC voltage source, measuring a total value of the output AC voltage $|U_{full}|$ provided by the voltage source, a total value of the AC voltage $|U_{load}|$ dropping over the ohmic load, a total value of the current |I| conducted at the same time, and the phase angle phi;
determining a second constant $C_L$ as $[|U_{full}|-|U_{load}|-C_R* |I|* \cos(phi)]/[|I|* \sin(phi)]$;
connecting the airplane via the supply line to the voltage source; and repeatedly calculating a compensation AC voltage as $|I|*C_R*\cos(phi) + |I|*C_L*\sin(phi)$ and adding the compensation AC voltage to the desired constant AC voltage to determine an output AC voltage of the voltage source, $|I|$ being the total value of the actual alternating current conducted from the voltage source to the airplane and phi being the actual phase angle between the output AC voltage of the voltage source and the alternating current conducted from the voltage source to the airplane.

12. The method of claim 11, further comprising the steps of:
   connecting another airplane via the supply line to the voltage source;
   repeatedly calculating a compensation AC voltage as $|I|*C_R*\cos(phi)+|I|*C_L*\sin(phi)$ and adding the compensation AC voltage to the desired constant AC voltage to determine an output AC voltage of the voltage source, $|I|$ being the total value of the actual alternating current conducted from the voltage source to the other airplane and phi being the actual phase angle between the output AC voltage of the voltage source and the alternating current conducted from the voltage source to the other airplane.

13. A system for providing a desired constant AC voltage to a variable load which is arranged remote of a voltage source, comprising:
   means for compensating for a voltage drop over an electrical supply line which connects the load to the voltage source by a compensation AC voltage, the compensation AC voltage being added to the desired constant AC voltage to determine an output AC voltage of the voltage source;
   means for measuring, once an ohmic load is connected instead of the variable load via the supply line to the AC voltage source, a total value of the output AC voltage $|U_{full}|$ provided by the voltage source, a total value of an AC voltage $|U_{load}|$ drop over the ohmic load, and a total value of the alternating current $|I|$ which is conducted at that same time;
   means for determining a first constant $C_R$ from the measured values for the linear variation of the compensation AC voltage with the total value of the alternating current and cos(phi) from the measured values;
   means for varying, once the variable load is connected instead of the ohmic load via the supply line to the AC voltage source, the compensation AC voltage depending both on an absolute value of an alternating current conducted to the load and on a phase angle phi between the output AC voltage of the voltage source and the alternating current, wherein the means for varying the compensation AC voltage depending both on the absolute value of the alternating current conducted to the load and on the phase angle phi comprises means for calculating the compensation AC voltage from two summands which are linearly dependent on the total value of the alternating current, and one of which is additionally comprises the factor $C_{R*}\cos(phi)$ and the other of which is additionally linearly dependent on sin(phi).

14. The system of claim 13, wherein the constant $C_R$ is determined as $(|U_{full}|-|U_{load}|)/|I|$.

15. The system of claim 13, further comprising means for connecting a mixed ohmic and inductive load instead of the variable load via the supply line to the AC voltage source, means for measuring a total value of the output AC voltage $|U_{full}|$ provided by the voltage source, a total value of the AC voltage $|U_{load}|$ dropping over the ohmic component of the mixed ohmic and inductive load, a total value of the current $|I|$ conducted at the same time, and the phase angle phi, and means for determining a second constant $C_L$ for the linear variation of the compensation AC voltage with the total value of the alternating current and sin(phi) from the measured values.

16. The system of claim 13, further comprising means for measuring a total value of the output AC voltage $|U_{full}|$ provided by the voltage source to the variable load, a total value of the AC voltage $|U_{load}|$ dropping over an ohmic component of the variable load, a total value of the current $|I|$ conducted at the same time, and the phase angel phi, and means for determining a second constant $C_L$ for the linear variation of the compensation AC voltage with a total value of the alternating current and sin(phi) from the measured values.

17. The system of claim 15, wherein the constant $C_L$ is determined as $[|U_{full}|-|U_{load}|-C_R* |I|* \cos(phi)]/[|I|* \sin(phi)]$.

18. The system of claim 15, wherein the constant $C_L$ is determined at a value of $|U_{load}|$ which is equal to the desired constant AC voltage.

19. The system of claim 18, wherein the constant $C_R$ is determined at a value of $|U_{load}|$ which is equal to the desired constant AC voltage.

20. The system of claim 18, wherein the constants $C_R$ and $C_L$ are at first approximated at a value of $|U_{full}|$ which is equal to the desired constant AC voltage, and then a value of $|U_{load}|$ which is equal to the desired constant AC voltage is approached with the approximated values of $C_R$ and $C_L$.

21. The method of claim 4, wherein the constant $C_L$ is determined as $[|U_{full}|-|U_{load}|-C_R*|I|* \cos(phi)]/[|I|* \sin(phi)]$.

22. The system of claim 16, wherein the constant $C_L$ is determined as $[|U_{full}|-|U_{load}|-C_R*|I|* \cos(phi)]/[|I|* \sin(phi)]$.

* * * * *